(12) United States Patent
Linnartz (10) Patent No.: US 7,000,113 B1
(45) Date of Patent: Feb. 14, 2006

(54) RECORDING INFORMATION WITH A WATERMARK RELATED TO A PRERECORDED MEDIUM MARK ON AN INFORMATION CARRIER

(75) Inventor: Johan P. M. G. Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 46 days.

(21) Appl. No.: 09/013,541

(22) Filed: Jan. 26, 1998

(30) Foreign Application Priority Data

Jan. 27, 1997 (EP) .................................. 97200165

(51) Int. Cl.
  *H04L 9/00* (2006.01)
  *H04N 7/167* (2006.01)
(52) U.S. Cl. ...................... 713/176; 380/201; 380/210; 725/31; 386/94; 705/57; 726/27
(58) Field of Classification Search ................ 713/177, 713/193, 100, 176, 168; 369/275.5, 275.3, 369/275.2, 275.1, 275.4, 53.21; 380/203, 380/202, 201, 210; 725/9, 20, 25, 31; 386/94; 705/51, 57, 59; 726/27
See application file for complete search history.

(56) References Cited

U.S. PATENT DOCUMENTS 4,743,490 A * 5/1988 Fayling ........................ 428/212
4,903,296 A * 2/1990 Chandra et al. .............. 705/56

(Continued)

FOREIGN PATENT DOCUMENTS

EP       0545472       * 12/1991

(Continued)

OTHER PUBLICATIONS

Schneier, Applied Cryptography, 1996, p. 459.*

(Continued)

*Primary Examiner*—Emmanuel L. Moise
*Assistant Examiner*—Zachary A. Davis
(74) *Attorney, Agent, or Firm*—Michael E. Belk (57) ABSTRACT

A system for copy protection of recorded information is disclosed, including an information carrier, a recorder and a player. The information carrier, e.g. an optical disc, includes a medium mark representing a first bitpattern, which medium mark cannot be copied on standard recording devices. The recorded information includes a watermark representing a second bitpattern, which second bitpattern has a predefined relationship to the first bitpattern. The watermark cannot be manipulated without disturbing the quality of the reproduction of the information. The relationship, preferably a one-way function, between the watermark and the medium mark requires that an illegal copy also has the corresponding medium mark. As neither the watermark nor the medium mark can be manipulated, a strong protection against illegal copying is achieved. The recorder includes encoder means for embedding the watermark in the information and generator means for generating the second bitpattern according to said relationship. The player includes verification means for verifying said relationship.

48 Claims, 2 Drawing Sheets

U.S. PATENT DOCUMENTS

| | | | |
|---|---|---|---|
| 5,412,718 A * | 5/1995 | Narasimhalu et al. | 380/4 |
| 5,434,917 A * | 7/1995 | Naccache et al. | 380/23 |
| 5,495,466 A * | 2/1996 | Dohmeier et al. | 369/53.36 |
| 5,607,188 A * | 3/1997 | Bahns et al. | 283/113 |
| 5,608,718 A * | 3/1997 | Schiewe | 369/275.4 |
| 5,649,054 A | 7/1997 | Oomen et al. | 395/2.38 |
| 5,678,863 A * | 10/1997 | Knight et al. | 283/113 |
| 5,724,327 A | 3/1998 | Timmermans et al. | 369/48 |
| 5,761,301 A * | 6/1998 | Oshima et al. | 235/494 |
| 5,809,006 A * | 9/1998 | Davis et al. | 369/47.49 |
| 5,930,369 A * | 7/1999 | Cox et al. | 380/54 |
| 5,946,286 A * | 8/1999 | Bahns | 369/275.3 |
| 6,205,249 B1 * | 3/2001 | Moskowitz | 380/54 |

FOREIGN PATENT DOCUMENTS

| | | | |
|---|---|---|---|
| EP | 0581227 | * | 2/1994 |
| WO | WO9713248 | | 10/1997 |

OTHER PUBLICATIONS

"New Directions in Cryptography", Whitfield Diffie and Martin E. Hellman, IEEE Transactions on Information Theory, vol. IT-22, No. 6, Nov. 1976, pp. 644-654.

U.S. Appl. No. 09/013,540.

U.S. Appl. No. 08/937,435.

* cited by examiner

RECORDING INFORMATION WITH A WATERMARK RELATED TO A PRERECORDED MEDIUM MARK ON AN INFORMATION CARRIER

FIELD OF THE INVENTION

The invention relates to the copy protection for recorded media.

BACKGROUND OF THE INVENTION

The invention relates to a system for copy protection of recorded information, includes an information carrier having a medium mark representing a first bitpattern, a recorder for recording the information on the information carrier and a player for reproducing the recorder information from the information carrier.

The invention further relates to a recorder for recording information on an information carrier with a medium mark representing a bitpattern.

The invention further relates to an information carrier with recorded information and a medium mark representing a bitpattern.

The invention further relates to a player for reproducing information from an information carrier and the system including for detecting a medium mark representing a bitpattern.

Copy protection has a long history in audio publishing. The presently installed base of equipment, including PC's with audio cards, provide little protection against unauthorized copying. In any copy-protection scheme, the most difficult issue is that a pirate can always attempt to playback an original disc, he can treat the content as if it were an analog home recording and record this. Consumer recorders should be able to copy recordings of consumer's own creative productions without any limitation, but prohibit the recording of copy-right material. Thus, the copy protection mechanism must be able to distinguish between consumers' own creations and content that originates from professional music publishers. The equipment must make this distinction based on the content only, as any reference to the physical source of content (e.g. disc or microphone) is unrealiable. For digital storage media such as DCC, "copy bits" have been defined, which bits indicate a copyright status, e.g. "no copy allowed", "free copy" or "one generation of copy allowed". Other copy bits may indicate that the medium storing the information must be a "professional" medium manufactured by pressing and not a "recordable" disc.

A system for copy protection of recorded information comprising a recorder, information carrier and player, is known from EP-0545472 corresponding to U.S. Pat. No. 5,724,327 to Timmermans et al. (listed as document D1 below). The copy protection is based on a so-called medium mark, i.e. a physical mark representing a bitpattern indicating the status of the medium, e.g. a code indicating a "professional" disk manufactured by pressing. A medium mark should not be copyable or changeable by standard recording equipment, and therefore it is to be stored on the information carrier in a manner different from the recorded information, such as audio or video. The medium mark is detected by the player and if it is not present or indicates a different status (e.g. "recordable disc" on an illegal copy), reproduction is blocked. The known information carrier has a prearranged guiding track, a so-called pregroove. In the track determined by the pregroove, information can be written in a predefined manner represented by optically readable patterns which are formed by variation of a first physical parameter, such as the height of the scanned surface. The pregroove has variations in a second physical parameter, such as an excursion in a transverse direction, also denoted as wobble. The wobble is FM modulated and this modulation represents a bitpattern which is used for recovering the information, e.g. a descramble code for recovering information stored as scrambled information. The bitpattern constitutes a medium mark, because the track wobble cannot be copied to a recordable disc on standard recording equipment. The known player includes a reader for reading the optical patterns and recovering apparatus for recovering the bitpattern from the medium mark. The player and information carrier form a system for controlled information reproduction. For this purpose, the player has apparatus for controlling the reproducing of the information depending on the medium mark. If the information is copied on a writable information carrier, the information of this copy will not be reproduced by a player, because during the writing process only the optical patterns are written in the predefined manner and the copy itself does not contain any medium mark.

Those skilled in the art are referred to the following documents:

- (D1) EP-0545472—corresponding to U.S. Pat. No. 5,724,327 to Timmermans et al. regarding Closed information system with physical copy protection
- (D2) WO 97/13248-A1—corresponding to U.S. application Ser. No. 08/723,653 filed Oct. 3,1996 by Linhartz regarding Watermarking encoded signals.
- (D3) EP-A 97200197.8 filing date 27 Jan. 1997—corresponding to U.S. application Ser. No. 09/013,540 filed Jan. 26, 1998 regarding Watermarking of Bitstream- or DSD-signals by A. A. M. Bruekers et al.
- (D4) U.S. Pat. No. 5,649,054 to Ooman et al. issued Jul. 15, 1997
- (D5) WO IB97/01156 corresponding to U.S. application Ser. No. 08/937,435 filed Sep. 25, 1997 regarding Lossless coding for DVD audio A. A. M. Bruekers et al.
- (D6) "New Directions in Cryptography" by Diffie and Hellman, IEEE Transactions on information theory, Vol IT-22, No. 6, November 1976, p. 644–654

The above references are hereby incorporated herein in whole by reference.

SUMMARY OF THE INVENTION

The inventors recognize a problem in the known system. The problem is that copying the information after reproduction cannot be sufficiently controlled. If the information includes the copy bits, such bits can be manipulated easily, e.g. on a PC or in a small electronic circuit. The information with the manipulated bits can be copied freely. If the information is recorded in a scrambled way and de-scrambled during reproduction using the medium mark bitpattern, the information can be recorded in its plain (descrambled) status and is not protected against copying at all.

It is an object of the invention to provide a system in which copying is better controlled and the copy protection cannot be circumvented by simple manipulation of the copy bits.

For this purpose, in the system according to the invention, the recorded information includes a watermark representing a second bitpattern. The second bitpattern has a predefined relationship to the first bitpattern, and the recorder includes an encoder for embedding the watermark in the information and a generator for generating the second bitpattern according to the predefined relationship between the first and the second bitpattern. The player also includes a verifier for verifying the relationship between the second bitpattern and the first bitpattern. The watermark is indicative of the copyright status of the recorded information. This has the advantage, that a signal representing the information after reproduction still contains the watermark and a recorder can be aware of the copyright status of the signal offered for copying, whereas the copyright status of the signal indicated by the watermark cannot be changed or manipulated without disturbing the signal. The prior art system using the medium mark as a descramble key or a fixed code is vulnerable to an 'illegal' recordable disc have a fixed, false medium mark. For example, any information read from a scrambled copy protected disc can be recorded on an illegal copy after (re-)scrambling using the fixed, false key. The relation between the watermark bitpattern and the medium mark bitpattern requires that the medium mark bit correlates with the recorded information. Hence in the system according to the invention a fixed, false medium mark cannot be used to make illegal copies. As there is a predefined relation defined between the first (medium) bitpattern and the second (watermark) mark bitpattern, a strong copy protection is realized, because an illegal copy must contain the specific medium mark correlated to the watermark according to the predefined relation and therefore the malicious party is forced to obtain the relation for manipulation. Choosing a suitable relation can create a barrier against such manipulation. The detection of the watermark in the player is relatively simple and the information read from the information carrier does not require any processing, such as descrambling. Verification in the player of the watermark bitpattern against the medium mark is a strong protection against copying, as neither of the marks can be easily manipulated. A further advantage is, that the verification function in the player can be relatively slow, as the verification of the predefined relationship needs to be performed only once when starting the reproduction of the recorded information.

It is to be noted, that WO 97/13248-A1, which is filed before but published after the priority date of this invention (PHN 15391, document D2 listed above) describes a watermarking system for a video signal. The watermarked video signal is recorded on a disk containing a medium mark. However the medium mark only indicates the type of medium and has no correlation with the signal or the watermark.

In a preferred embodiment of the system, the relationship includes a cryptographic one-way function. The one-way function prevents, when the required result (e.g. the watermark bitpattern) is known, that the source (e.g. the medium mark bitpattern) can be found by calculating 'backwards'. This has the advantage, that the malicious party is forced to obtain the medium mark bitpattern directly from the original medium. The original medium may not be available to him or the player may be equipped not to make the medium mark bitpattern externally available. This creates a significant barrier for the malicious party trying to make an illegal copy with a "chinese" copy of the medium mark.

These and other aspects of the invention will be apparent from and elucidated with reference to the embodiments described hereinafter and with reference to the accompanying drawings, in which.

We propose a copy control method for bitstream- or DSD-signals (Direct Stream Digital) stored on storage media such as DVD audio (Digital Versatile Disc). The method relies on a watermarking method, such as the one proposed by A. A. M. Bruekers et al, in document D3 listed above. Recently, it has been realized that watermarks or embedded signalling can be used to make copy protection methods more robust against attacks. Embedded signaling or watermarking is a method of burying information in the audio content. In this text we use the word professional for any product that is officially registered with a trusted party which represents the interests of the recording industry and hardware manufacturers. We denote any other product as a consumer product. Consumer products are assumed to obey copyright rules, enforced either by a patent licensing agreement or by law, or both.

For Copy Protection a total solution is needed. Watermarking is not restricted to digital formats, but can also be embedded and detected in analog signals. Often, spread-spectrum technology is proposed for embedding watermarks into audio. A technical difficulty of spread-spectrum methods is that retrieval or detection of such embedded data requires substantial signal processing. Although this is not a problem for professional equipment used in legal cases to prove the origin of the audio material, the computational effort appears far beyond what is feasible and economically reasonable within consumer electronic products to support copy protection. A particular problem is that the audio quality requirements set by the music industry would require such large spreading gains that synchronization and data detection would take excessively long integration times. Parameters considered in spread spectrum watermarking presumably do not satisfy current audio quality requirements. Future standards aim at further enhancing the audio quality and simultaneously require secure protection of music IPR. It is our strong belief that it is unlikely that satisfactory methods will indeed be found in near future to combine these two requirements at reasonable cost. Particularly, the absence of protective measures in the installed base of audio equipment causes a problem. It appears virtually impossible to avoid that signals can be copied by going back to analog. Moreover, consumer expectations are that some kind of home taping, e.g. to listen in the car, should be possible. On top of that, some countries levy a fee on blank tape for analog copying for private use, and certain technical means to restrict analog copying are not legally acceptable. There appears an opportunity to set new standards for storage and representation of digital audio (e.g. DVD), but technology to solve the copy protection issue completely (i.e., including analog copying) is unlikely to become available soon. For audio, a bitstream-only solution may be of use. Given this situation, it can be useful to protect new audio storage media against unauthorized copying of discs, even if analog copying remains possible. In order to copy, conversion into other domains (e.g. analog) are needed and some loss of quality occurs. The scheme proposed here using digital watermarking does not solve the existing problem of piracy and excessive home taping whereby the audio signal is converted to analog as part of the copy process. If the industry adopts a copy protection scheme based on watermarking, it will presumably come to a layered approach. The most robust watermark should withstand D/A and A/D conversion, but this will require long integration times for the detection. This implies that the record or playback inhibit decision will be delayed. A watermark in the bitstream can be detected within milliseconds and trigger copy protective measures immediately. Such fast detection appears essential if bitstream signals are transferred over open busses (such as P 1394). In summary, the method described in this document has the following properties:

Bitstream or DSD signals with copy-right restrictions can immediately be distinguished from home recordings.

Traceability of the professional or consumer recorder.

It can co-exist with other methods that also protect against other forms of copying (e.g. analog). In particular, it appears of interest to add conditional playback using the method proposed here to a conditional recording method which also checks for spread spectrum watermarks.

In the invention we propose a scheme that protects against direct (bitwise) copying of high quality digital DSD streams. The method does not technically protect against conversion of DSD to PCM or analogue. However, some protection is provided against such attacks in the sense that if a bitstream/ DSD signal, it is converted back into DSD may be watermarked with the serial number of the consumer DSD encoder. The method relies on a watermarking method, such as the one proposed by A. A. M. Bruekers et al. Our method can coexist with many other forms of copy protection, including serial copy management bits and the embedded signaling of spread spectrum watermarking. The additional hardware in consumer equipment appears very small. Another tool used in the system embodiment is a medium mark, i.e. a method to distinguish a professionally mastered disc from a recordable. Implementations of such tool can be a wobble key (as known from document D1 above), modulation of channel code errors (e.g. EFM) or intentional modulation the jitter of pits and lands of a disc, or embedding an on-disc chip, or just data written in the lead-in area which is not accessible by consumer recorders. These two tools (watermark and medium mark) are used to support the following features (both or just one):

Conditional recording is the most commonly known method for copy protection. A consumer recorder will not record material unless it sure that the material may indeed be copied legally.

Conditional playback, on the other hand, accepts that some people will be able to get the bits of copy-righted DSD on a pirate disc anyhow.

Conditional playback will make sure that such a pirate disc can not playback on consumer players. That is, pirates cannot commercially distribute illegal copies. In conditional playback, a consumer DVD audio player will only play audio discs if certain copyright conditions are met. The player identifies the audio content either as a consumer recording or as professionally published audio content, by detecting or checking for a watermark in the audio stream. In the latter case (professional content protected by copyright), the player checks whether the physical disc is original and professionally mastered, rather than a copy on a consumer recorder or consumer disc press. This requires both a marking method for the content (watermarking) and a method for marking the physical storage medium that can only be produced by a professional recorder or pressing machine.

Figure 1:
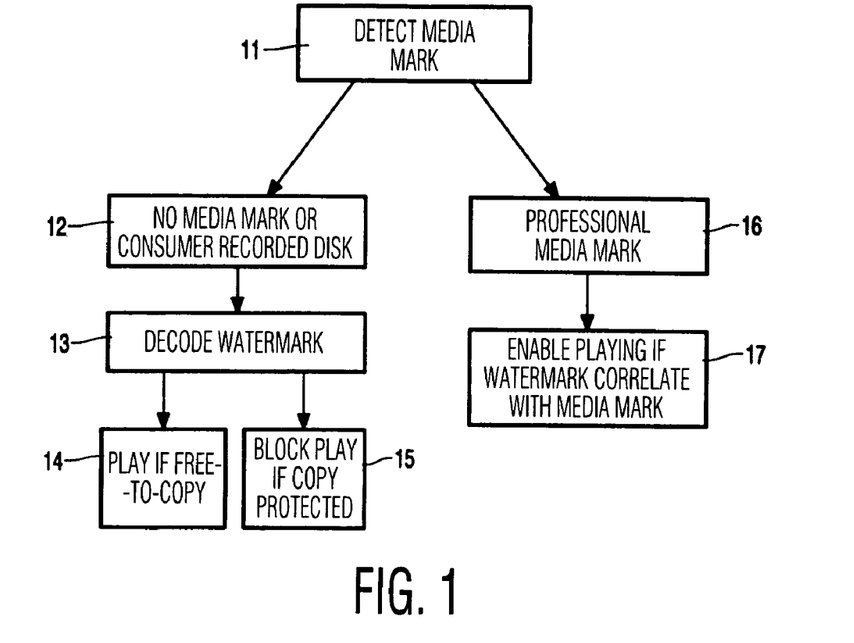
FIG. 1 shows conditional playback rules.

FIG. 1 shows schematically the conditional playback rules embedded in the consumer player, which are applied after a watermark has been detected. As a first check 11 the presence of the medium mark, usually a physical mark, is detected by the reading head in a manner different from reading recorded information, e.g. by demodulation of the wobble. If the medium mark is present it is verified to be a valid professional disc mark at a second check 16, and if so playing 17 is enabled if the watermark and the medium mark correlate according to a predefined relation. If the medium mark is not present or indicates a consumer recorded disc (checked in a third check 12), the watermark is decoded in decoder 13. The watermark may be indicative for free-to-copy (audio) information, and then playing 14 of the disc is enabled. If the watermark is indicative for copy-protected information, the playing action is blocked in state 15.

In a first embodiment of the system professionally mastered audio discs carry an identifier unique to the publisher, which can not be copied. This identifier can for instance be a set of bits written in an area that is not accessible for recorders, it can be a wobble key or a special pattern in the running DC component of the EFMplus channelcode used in DVD. The DVD audio player checks for this mark. If this mark is unavailable or if it contains a special code reserved for home disc recorders, it will only playback the DSD stream if a special watermark is found that identifies the DSD encoder. If this watermark is not found, as would be the case if a professionally released audio stream is copied illegally to a recordable disc, the audio is not played back at all. To avoid any degradation of the quality of professional DSD releases this scenario does not require that the audio content of professionally released audio titles is watermarked, but this scenario requires that the watermark embedding method is used in consumer equipment. Besides a frequently repeated copy control bit, a unique serial number is embedded into the audio stream by all DSD encoders/recorders in the consumer market. The circuitry to embed this number appears simple. The consumer can not copy professional DSD audio directly to a DVD audio disc, as it will not playback (because of the watermark be absent). If he converts the signal to analog, PCM or another format, and then re-creates DSD, the particular DSD recorder can be traced. Moreover, the scheme can be defined in such a way that home recordings have smaller dynamic range. A further strengthening is achieved if each player not only checks whether a watermark is present on consumer discs, but also check whether a valid serial number is embedded. Known cryptographic methods can be used for integrity checks, e.g. concatenating a digital signature to the serial number. This avoids that a pirate can tamper with serial numbers.

A second embodiment is similar to the first, but the bit stream of professionally released audio does also contain a watermark. This watermark is used to verify the medium mark in a cryptographic way. The medium mark now differs from title to title. The relation between the bitpattern represented by the watermark and the bitpattern represented by the medium mark is not easy to manipulate. Preferably, the crytographic relation is chosen as follows. Let $y=F(x)$ and $x=G(u)$ be two cryptographic one-way functions, i.e. their inverse is computationally infeasible to compute with finite arithmetic resources. This scenario uses a seed u to create x and y, according to $x=G(u)$ and $y=F(x)=F(G(u))$. In this concept G and F may be the same function, but this is not necessary. On a professionally mastered disc, the embedded watermark contains y and the medium mark carries x. Professional recorders always perform the G function before writing a medium mark. That is, they embed a medium mark x which is internally generated from the user input u. All (consumer) players perform F to verify the medium mark if a watermark is found that indicates that the content is copy protected. Consumer recorders are assumed not to be able to write a medium mark at all. Using the system the copy-right owner can decide himself whether or not to release the seed u, which allows copying. In professional music publishing, it can be necessary to create a tape master of the music title. The audio is then pre-encoded with embedded the watermark y. During the production process, the professional recorder (disc master generator machine) directly accepts the watermarked DSD 30 and inserts this after the DSD encoder/watermarker 23 of FIG. 2. Seed u 22 is also inserted during this process. This also provides some protection if the master tape is stolen, but u is not compromised. Preferably, the recorder checks the watermark against us and x (as described with FIG. 4, conditional recording).

Figure 2:
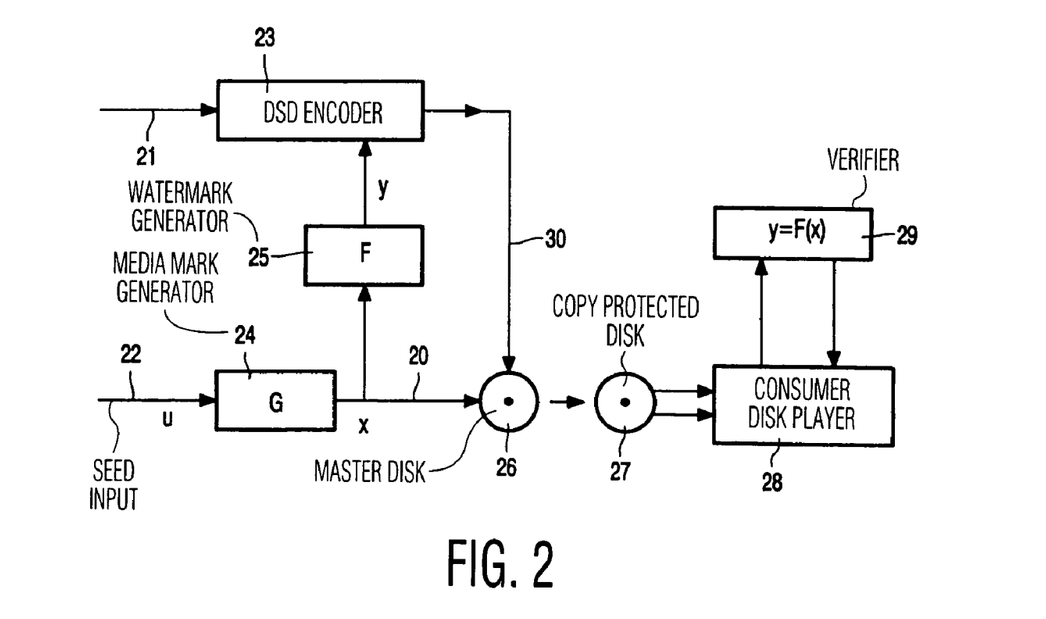
FIG. 2 shows a copy protection system with a recorder, information carrier and player.

FIG. 2 shows a copy protection system with a recorder, information carrier and player. The Professional Recorder has an audio input 21 to a DSD encoder 23, which also embeds the watermark bitpattern y in the bitstream 30 to be recorded on the master disc 26. The watermark bitpattern y is available on the output of generator 25, which has bitpattern x to be represented by the medium mark 20 on its input. The medium mark 20 is created on the master disc 26. Preferably the bitpattern x is generated by a generator 24 from the input seed u on the input 22. The master disc 26 is multiplied by the usual manufacturing methods to copy protected information carriers 27, which are to be played in the consumer player 28. The consumer player has a verifier 29, which compares the detected watermark bitpattern y with a calculated value y', which is based on the detected bitpattern x from the medium mark.

In this scenario, a pirate must have access to a professional recorder to create media marks on a pirate disc. A pirate can copy the audio and recover y, but he cannot calculate x. This system adds security to the copy protection scheme, particularly if we can ensure that x cannot easily be read from the disc, i.e., remains within the first chip in the basic engine (that must use x to verify watermark y). Moreover, even if a pirate can read x, he must find u to enter it into the recorder and to have x written as a medium mark. No recorder will directly accept to x and write it to disc. In this scenario, a pirate must physically modify both his (officially registered mastering) recorder (to bypass the G function) and his player (to extract x).

In a further embodiment copy protection can be provided for consumer recordings. It can be envisioned that consumers want to publish or disseminate their own recorded audio creations at a small scale. We now describe how consumer recorders can implement some of the elements of the above scheme. This gives consumers the possibility to create discs that can only be copied directly (bit-by-bit) if the recipient also knows seed u. Part of the medium mark must be recordable by the recipient. A possible embodiment is to split x into two parts, with $x=x_1\|x_2$, such that $y=F(x_1\|x_2)$. Then $x_1$ acts as a medium mark, similar to the scenario described above, and $x_2$ is written as a separate file on the disc. Professional recorders can write $x_1$ as well as $x_2$. Consumer recorders can write $x_2$ but on recordable discs, $x_1$ has a default value $x_1=x\_c$ prepressed on the disc. The consumer recorder embeds watermark $y=F(x\_c\|x_2)$ where $x_2$ is generated from a seed u, i.e., by taking a portion of the bits of G(u). The owner can copy his own creations because he knows u. In players, neither $x_1$ nor $x_2$ leaves the basic engine, so it remains hidden for the user.

Figure 3:
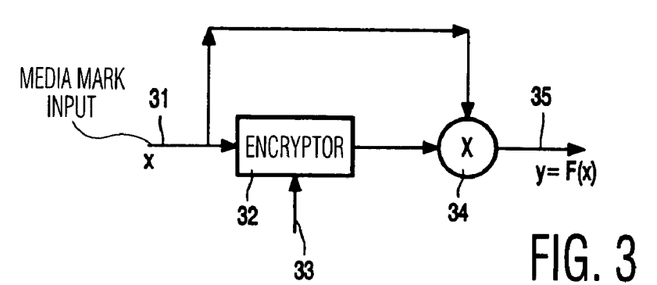
FIG. 3 shows a one-way function.

For the above embodiment, a suitable relation between the watermark bitpattern and the medium mark bitpattern is a one-way function. An implementation of the one-way function can be $y=x^2$ mod N with N a public modulus. Here N is the product of two secret large primes (N=pq). In fact N can be part of the data that is embedded in the watermark, i.e., concatenated to y. Another possibility is the discrete-log one-way function conjectured by Diffie and Hellman [1976] (=document D6 listed above): $F(x)=\alpha^x$ in GF(p) with $\alpha$ a primitive element of GF(p). Here p is a large prime such that p−1 has a large prime factor. The above two implementations bear the disadvantage that the size of the arguments, i.e., the number of bits needed to be secure, is quite large. A practical system based on fewer bits can be to apply an appropriate secret-key encryption algorithm, e.g. the DES, with $y=F(x)=x \oplus DES(x)$. This is illustrated in the circuit of FIG. 3. FIG. 3 shows an implementation of a one-way function generator based on secret-key encryption algorithm. On the input 31 the medium mark bitpattern x is applied and processed in the encryptor 32 by using a key from a key input 33. The output of encryptor 32 is bitwise EXOR'd with the input x by logic unit 34, resulting in bitpattern y on the output 35. In this circuit, the key can be made public or included in the watermark, i.e. concatenated to y.

Figure 4:
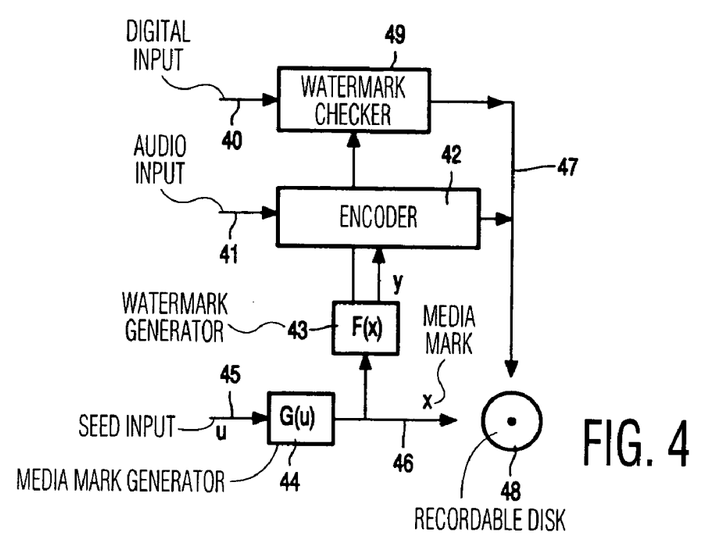
FIG. 4 shows a recorder.

FIG. 4 shows a recorder for consumers. The recorder has an analog audio input 41 connected to an encoder 42 for DSD or PCM audio encoding, which encoder produces at the output a bitstream 47 to be recorded on recordable disc 48. The encoder 42 embeds a watermark bitpattern y in the bitstream 47. The bitpattern y is created by generator 43 from a bitpattern x, whereas x is to be represented by a medium mark 46 and may include a number of bits derived from a prepressed physical mark on the recordable disc 48. The recorder has a seed input 45 for a seed u connected to a generator 44 for generating the bitpattern x. The recorder has a second input 40 for a digital audio signal connected to a watermark checker 40. The checker 49 is also connected to generator 43, for receiving bitpattern y and verifies the presence of a watermark. The basic recording control function of the checker is to block recording if a professional "no-copy" watermark is detected. Preferably, a watermark is present indicative of copyable content, a recording can be made only if the corresponding seed u is applied to the seed input 45. In a different embodiment, the consumer recorder only has the digital input 40 and the watermark checker 49, whereas the analog input and watermark encoder are not present. Further embodiments of the recorder are equal to the above but are not provided with an external input 45, but have an internal generator for u, e.g. a random number generator. In that case also generator 44 may not be present.

In its pure form, a conditional recording scenario does not perform checks during playback. In a different embodiment the consumer DSD recorder accepts an analog signal, possibly conditional to some analog copy information check. The on-board DSD encoder embeds a watermark into the stream. This mark consists of two parts: copy protection data and a serial id. number of the recorder. The consumer DSD recorder accepts a digital DSD stream only if it can recognize valid copy control data. This copy control data should state that this material may legally be copied onto a disc. Such a recorder is similar to the recorder shown in FIG. 4, but does not have the seed input 45 and generator 44.

The consumer DSD recorder does not accept a DSD stream that contains Copy Control Marks that prohibit recording. In an embodiment of a strong form, the absence of Copy Control Information is interpreted as "no copy allowed". In a weaker form, signals without copy control information are automatically resampled and watermarked. This weakens the copy protection, but leads to some quality degradation.

In a further embodiment a copy once feature is included. A professional DSD stream contains embedded copy-right data that grants permission to copy once. This can be implemented by embedding a further watermark $y_{co}$ (in addition to mark described earlier). Moreover the professional disc contains a special permission mark $x_{co}$ where $y_{co}=H(x_{co})$ with H( ) a cryptographic one-way function. The mark $y_{co}$ remains with the audio (possibly embedded) during playback, but it is removed by the consumer recorder.

Figure 5:
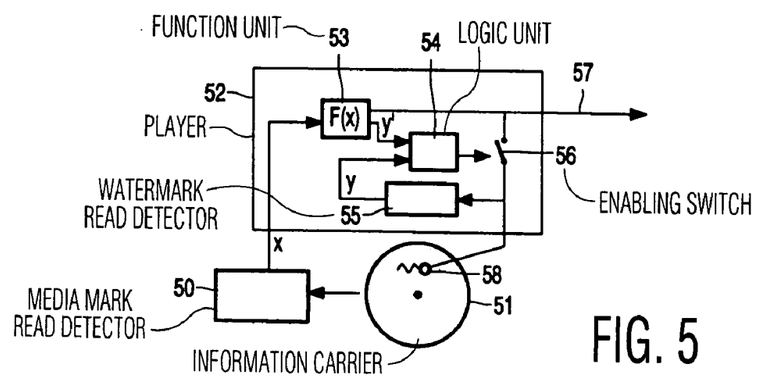
FIG. 5 shows a player.

FIG. 5 shows a player 52 for reproducing information from a copy protected information carrier 51. The player is provided with a read head 58 and read signal processing apparatus of a usual type, such as an optical head, a detector, a channel decoder and an error decoder of a CD or DVD optical disc player. The player includes watermark read detector 55 for detecting a bitpattern y represented by the watermark in the recorded information on the information carrier 51. The bitpattern y is coupled to a logic unit 54, which operates the enabling switch 56. The logic function of unit 54 has been discussed with reference to FIG. 1 and the conditional playback rules. The player is provided with media mark read detector 50 for detecting the medium mark and deriving the bitpattern x from the medium mark, e.g. by demodulating the wobble modulation as known from document D1 listed above. The player is provided with a verifier for verifying a predefined relationship between the bitpattern x and the bitpattern y. In the verifier, the bitpattern x is coupled to a function unit 53 for performing a predefined function F(x), e.g. a one-way function. The output y' of the function unit 53 is coupled to logic unit 54 and compared to y. The enabling switch 56 passes the recovered audio signal to the output 57 if the bitpatterns x and y do show the predefined relationship.

It is noted that, hybrid solutions using conditional recording and conditional playback can co-exist. Of particular interest is a scenario in which (despite technical difficulties described in the introduction) a watermark check in the analog domain should be performed by recorders. If a pirate manages to modify his recorder to bypass this conditional recording check, and put professional DSD on a disc anyhow, the copy protection schemes described here can prevent playback on players in the market.

Although the invention has been explained mostly by embodiments using DSD audio, several embodiments of the watermarking of audio and/or video can be used. Watermarking is also possible for PCM audio. An example is hiding data in the LSB's, possibly including a spectral shaping of their effect. An implementation for such embedding scheme has been presented by Oomen et al. in 1994 (see document D4 listed above). For our application, we preferably would only embed data in a limited number of preselected samples, with one bit per selected sample. Such embedding scheme can be implemented within the same device that converts professional (24 bit) audio into lower resolution (e.g. 16 bits) The method previously mentioned for DSD watermarking (in document D3 listed above) may also be used for embedding data in PCM. Another option is to use the loss-less encoding for embedded signaling. One method for lossless encoding was proposed by Bruekers et al (described in document D5 listed above) A possible method of embedding data is by choosing the properties or parameters of the predictive filter (FIG. 10, item 152 in document D5 listed above) in accordance with watermarking rules. For instance, a digital watermark "1" can be represented by choosing an even number of filter taps and a "0" is represented by an odd number of taps. In another implementation, the filter coefficients are quantized according to a similar rule. Further, the entropy encoder can embed data by adapting its parameters. Such signals embedded into the PCM signal can be used to build a copy protection scheme based on any of the previously mentioned concepts. A pirate can no longer copy the compressed PCM bit-by-bit onto a disc that he can distribute commercially. He must go through the process of decompression and compression. Although this does not lead to a degradation in quality (because the coding is loss-less), it results in a different digital signal, the resulting file will contain more bits if consumer recorders can compress less efficiently and the resulting file will contain information about the serial number of the recorder.

In the embodiments a disc has been described as information carrier, but any other carrier can be used in the invention, such a tape or broadcast, as long as the medium mark is supplied in a way which cannot be easily copied. Further the invention lies in each and every novel feature or combination of features.

What is claimed is:

1. A system comprising:
    a recorder, including:
        reading means for reading from an information carrier, a content of a medium mark, said content comprising a first bitpattern;
        generating means for generating a second bitpattern according to a predefined relationship of with the first bitpattern;
        encoder means for embedding a watermark containing the second bitpattern in user information to be recorded; and
        recording means for recording the watermarked user information on the information carrier for storage, wherein the medium mark is contained in a wobble of a track of the information carrier, the wobble representing the first bit pattern;
    the system further comprising:
    a player including:
        first reading means for reading the content of the medium mark, said content comprising the first bitpattern;
        second reading means for reading the embedded watermark containing the second bitpattern from the user information;
        verifying means for establishing a verification of the relationship between the second bit pattern and the first bit pattern; and
        enabling means for enabling playback of the recorded watermarked user information from the information carrier based on said verification.

2. The system of claim 1, in which the relationship includes a cryptographic function.

3. The system of claim 2, in which the relationship includes a one-way function.

4. The system of claim 1, in which the second bitpattern identifies the encoder means.

5.

6. The system of claim 1 in which the medium mark is pressed in the information carrier during manufacture.

7. The system of claim 1 in which the watermarked user information is stored on the information carrier in a different manner than the medium mark is stored, the user information writing means being insufficient for writing the medium mark on the information carrier.

8. The system of claim 1, wherein said enabling means comprises an enabling switch.

9. A recorder comprising:
reading means for reading from an information carrier, a content of a medium mark, said content comprising a first bitpattern;
generating means for generating a second bitpattern according to a predefined relationship with the first bitpattern; and
encoder means for embedding a water mark containing the second bitpattern in user information to be recorded; and
recording means for recording the watermarked user information in the information carrier for storage, in which the medium mark is contained in a wobble of a track of the information carrier, the wobble representing the first bit pattern.

10. The recorder of claim 9, in which:
the recorder further comprises marking means for writing the medium mark on the information carrier; and
the generating means generate the first bitpattern from a seed according to a further predefined relationship.

11. The recorder of claim 10, in which the generating means generate the first bitpattern by combining a first part represented by a prepressed mark on a recordable information carrier and a second part generated from the seed.

12. The recorder of claim 10, in which the further predefined relationship includes a cryptographic one-way function.

13. The recorder of claim 9, in which:
the recorder further comprises means for reading the first bitpattern from the information carrier;
the first bit pattern indicates a copy protection status of the information carrier;
the relationship includes a cryptographic function;
the relationship includes a one-way function;
the second bitpattern identifies the encoder means;
the recorder further comprises marking means for writing the medium mark on the information carrier;
the generating means generate the first bitpattern from a seed according to a further predefined relationship; and
the generating means are arranged for generating the first bitpattern by combining a first part represented by a prepressed mark on the information carrier and a second part generated from a seed.

14. An information carrier comprising:
a medium mark, wherein a content of said medium mark comprises a first bitpattern, in which the medium mark is contained in a wobble of a track of the information carrier, the wobble representing the first bit pattern; and
recorded user information encoded with a watermark containing a second bitpattern different from the first bit pattern and having a predefined relationship with the first bitpattern whereby the relationship between the second bitpattern and the content of the first bitpattern can be verified in a computer process.

15. The information carrier of claim 14, in which the first bitpattern includes:
a first part identifying a source of the information carrier; and
a second part identifying the recorded information.

16. The information carrier of claim 14, in which:
the relationship includes a cryptographic function;
the relationship includes a one-way function; and
the second bitpattern identifies encoded user information.

17. A player for an information carrier comprising:
first reading means for reading a content of a medium mark, said content comprising a first bitpattern, in which the medium mark is contained in a wobble of a track of the information carrier, the wobble representing the first bit pattern;
second reading means for reading an embedded watermark containing a second bitpattern from recorded user information;
verifying means for verifying a predefined relationship between the second bitpattern and the first bitpattern; and
enabling means for enabling playback of recorded user information from the information carrier based on said predefined relationship.

18. The player of claim 17, in which the verifying means includes a cryptographic one-way function.

19. The player of claim 18, in which:
the verification means generate a verification pattern by applying a one-way function to the first bitpattern; and
the verifying means compare the verification pattern and the second bitpattern in order to verify the predefined relationship.

20. The player of claim 18, in which:
the relationship includes a cryptographic one-way function;
the relationship includes a one-way function; and
the second bitpattern identifies the predefined relationship.

21. The player of claim 17, wherein said enabling means comprises an enabling switch.

22. A system for copy protection of information recorded on an information carrier, the system comprising:
a medium mark on the information carrier containing a first bitpattern, wherein the medium mark is contained in a wobble of a track of the information carrier, the wobble representing the first bit pattern,
a recorder for embedding a watermark into a set of information data and for recording a watermarked set of information data on the information carrier, the watermark containing a second bit pattern having a predefined relationship to the first bitpattern, and
a player for verifying the relationship between the first bit pattern and the second bit pattern and for reproducing the watermarked set of information from the information carrier.

23. The system of claim 22, wherein the predefined relationship comprises a cryptographic one-way function.

24. The system of claim 23, wherein the second bitpattern is generated by applying a one-way function to the first bitpattern.

25. The system of claim 22, wherein the recorder comprises encoding means for encoding a unique seed on the information carrier allowing the encoding means to be identified from the second bitpattern.

26. A recorder for recording information on an information carrier containing a medium mark, contents of the medium mark containing a first bit pattern, the recorder comprising:
generator means for generating a second bitpattern according to a predefined relationship between the first bit pattern and the second bitpattern, wherein the medium mark is contained in a wobble of a track of the information carrier, the wobble representing the first bit pattern,
encoder means for embedding a watermark in the information, the watermark containing the second bitpattern, and
means for recording watermarked information on the information carrier containing the medium mark.

27. The recorder of claim 26, wherein the recorder further comprises marking means for generating the first bitpattern from a seed according to a further predefined relationship and for providing the medium mark on the information carrier.

28. The recorder of claim 27, wherein the further predefined relationship includes a cryptographic one-way function.

29. The recorder of claim 26, wherein the generator means are arranged for generating the first bitpattern by combining a first part represented by contents of a prepressed mark on a recordable information carrier and a second part generated from a seed.

30. The recorder of claim 26 further comprising further encoding means for cryptographically scrambling the watermarked information using the first bit pattern before the watermarked information is recorded so that recorded information is scrambled.

31. The recorder of claim 26, wherein the recorder further comprises means for reading the medium mark from the information carrier.

32. The recorder of claim 26 wherein the recorder manufacturers a disk by pressing.

33. An information carrier comprising:
   recorded information, and
   a medium mark, contents of the medium mark containing a first bitpattern and wherein the medium mark is contained in a wobble of a track of the information carrier, the wobble representing the first bit pattern, the recorded information including a watermark containing a second bitpattern different from the first bit pattern and having a predefined relationship to the first bitpattern.

34. The information carrier of claim 33, wherein the first bitpattern includes a first part identifying a source of the information carrier, and a second part identifying the recorded information.

35. A player for reproducing information from an information carrier and comprising:
   means for reading a medium mark from the information carrier, contents of the medium mark containing a first bitpattern, wherein the medium mark is contained in a wobble of a track of the information carrier, the wobble representing the first bit pattern,
   means for recovering a watermark from information read from the information carrier, the watermark containing a second bitpattern, and
   verification means for verifying a predefined relationship between the second bitpattern and the first bitpattern, and
   means for reproducing information containing the watermark from the information carrier.

36. The player of claim 35, wherein the verification uses a cryptographic one-way function.

37. The player of claim 35, wherein the verifications means are arranged for generating a verification pattern by applying a one-way function to the first bitpattern and for comparing the verification pattern and the second bitpattern.

38. The player of claim 35 wherein reproduction of information by the player is dependent upon the predetermined relationship as verified by the verification means.

39. A system for copying protection of information recorded on an information carrier, the system comprising:
   a medium mark on the information carrier containing a first bitpattern,
   a recorder for embedding a watermark into a set of information data and for recording a watermarked set of information data on the information carrier, the watermark representing a second bit pattern having a predefined relationship to the first bitpattern, and
   a player for verifying the relationship between the first bit pattern and the second bit pattern and for reproducing the watermarked set of information from the information carrier, wherein the first bit pattern is a cryptographic key for de-scrambling recorded information to recover the watermarked information, and the second bit pattern is recovered from the watermark of the watermarked information.

40. A recorder for recording information on a record carrier, comprising:
   means for reading a medium mark from the record carrier, contents of the medium mark containing a first bitpattern, wherein the medium mark is contained in a wobble of a track of the information carrier, the wobble representing the first bit pattern;
   means for determining whether the information contains a watermark containing a second bitpattern that has a predetermined relationship with the first bit pattern; and
   means for recording information dependent upon result of the means for determining.

41. The recorder of claim 40 wherein the means for determining further identifies a verification pattern by applying a one-way function to the first bitpattern and comparing the verification pattern and the second bitpattern.

42. A system comprising:
   a recorder, including:
      reading means for reading from an information carrier, a content of a medium mark, said content comprising a first bitpattern;
      generating means for generating a second bitpattern according to a predefined relationship of with the first bitpattern;
      encoder means for embedding a watermark representing the second bitpattern in user information to be recorded, wherein the first bit pattern is a cryptographic key for de-scrambling recorded information to recover the watermarked information, and the second bit pattern is recovered from the watermark of the watermarked information; and
      recording means for recording the watermarked user information on the information carrier for storage;
   the system further comprising:
   a player including:
      first reading means for reading the content of the medium mark, said content comprising the first bitpattern;
      second reading means for reading the embedded watermark representing the second bitpattern from the user information;
      verifying means for establishing a verification of the relationship between the second bit pattern and the first bit pattern; and
      enabling means for enabling playback of the recorded watermarked user information from the information carrier based on said verification.

43. A recorder comprising:
   reading means for reading from an information carrier, a content of a medium mark, said content comprising a first bitpattern;
   generating means for generating a second bitpattern according to a predefined relationship with the first bitpattern; and encoder means for embedding a watermark representing the second bitpattern in user information to be recorded; and recording means for recording the watermarked user information in the information carrier for storage, wherein the first bit pattern is a cryptographic key for de-scrambling recorded information to recover the watermarked information, and the second bit pattern is recovered from the watermark of the watermarked information.

44. An information carrier comprising:

a medium mark, wherein a content of said medium mark comprises a first bitpattern, and wherein the medium mark is contained in a wobble of a track of the information carrier, the wobble representing the first bit pattern; and recorded user information encoded with a watermark containing a second bitpattern different from the first bit pattern and having a predefined relationship with the first bitpattern whereby the relationship between the second bitpattern and the content of the first bitpattern can be verified in a computer process, wherein the first bit pattern is a cryptographic key for de-scrambling recorded information to recover the watermarked information, and the second bit pattern is recovered from the watermark of the watermarked information.

45. A player for an information carrier comprising:

first reading means for reading a content of a medium mark, said content comprising a first bitpattern;

second reading means for reading an embedded watermark representing a second bitpattern from recorded user information, wherein the first bit pattern is a cryptographic key for de-scrambling recorded information to recover watermarked information, and the second bit pattern is recovered from the watermark of watermarked information;

verifying means for verifying a predefined relationship between the second bitpattern and the first bitpattern; and enabling means for enabling playback of recorded user information from the information carrier based on said predefined relationship.

46. A recorder for recording information on an information carrier containing a medium mark, contents of the medium mark representing a first bit pattern, the recorder comprising:

generator means for generating a second bitpattern according to a predefined relationship between the first bit pattern and the second bitpattern, encoder means for embedding a watermark in the information carrier, the watermark representing the second bitpattern, and means for recording watermarked information on the information carrier containing the medium mark, wherein the first bit pattern is a key for de-scrambling recorded information to recover watermarked information, and the second bit pattern is recovered from the watermark of watermarked information.

47. An information carrier comprising:

recorded information, and a medium mark, contents of the medium mark containing a first bitpattern wherein the medium mark is contained in a wobble of a track of the information carrier, the wobble representing the first bit pattern, the recorded information including a watermark containing a second bitpattern different from the first bit pattern and having a predefined relationship to the first bitpattern, wherein the first bit pattern is a cryptographic key for de-scrambling recorded information to recover watermarked information, and the second bit pattern is recovered from the watermark of watermarked information.

48. A player for reproducing information from an information carrier and comprising:

means for reading a medium mark from the information carrier, contents of the medium mark representing a first bitpattern, means for recovering a watermark from information read from the information carrier, the watermark representing a second bitpattern, and verification means for verifying a predefined relationship between the second bitpattern and the first bitpattern, and means for reproducing information containing the watermark from the information carrier, wherein the first bit pattern is a cryptographic key for de-scrambling recorded information to recover watermarked information, and the second bit pattern is recovered from the watermark of watermarked information.

* * * * *